Patented May 12, 1931

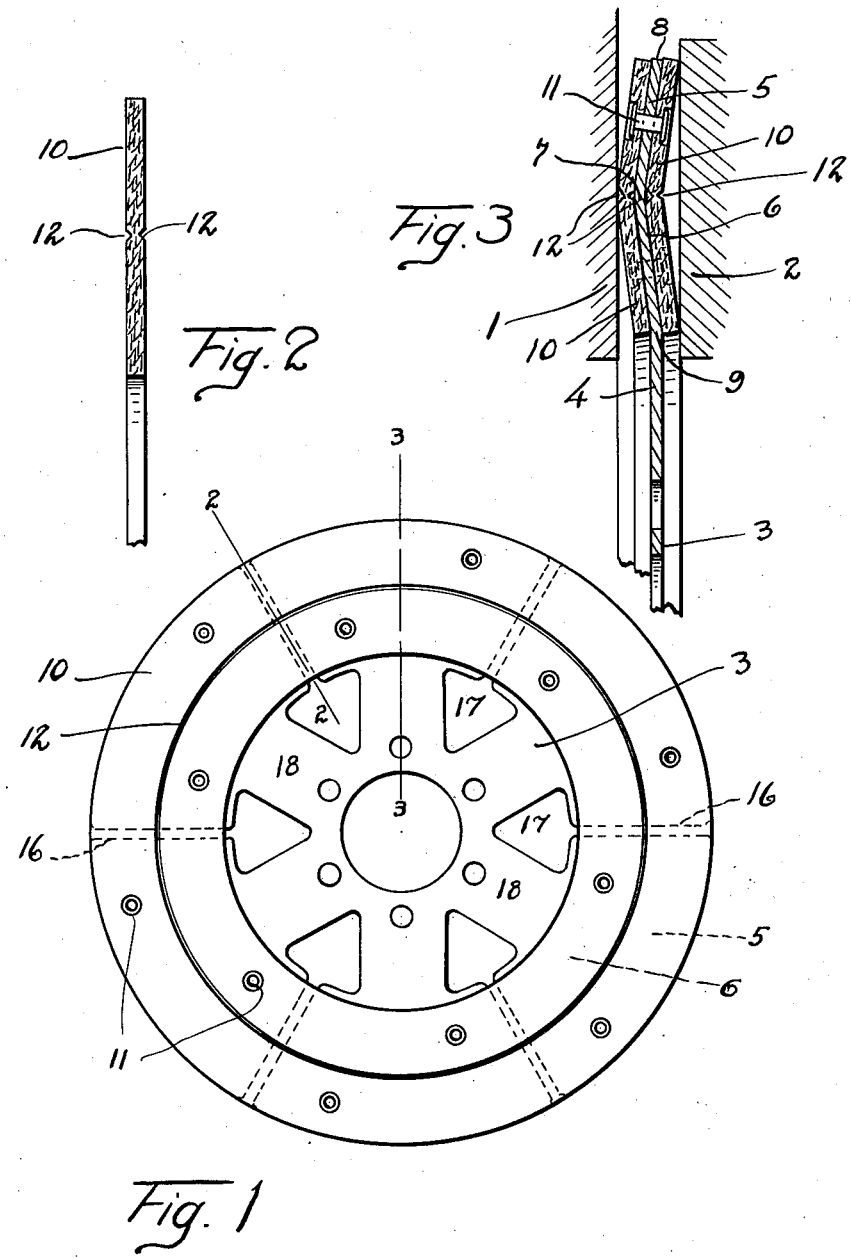

1,804,904

UNITED STATES PATENT OFFICE

ERNEST E. WEMP, OF DETROIT, MICHIGAN

CLUTCH DISK

Application filed January 24, 1929. Serial No. 334,621.

This invention relates to clutch disks and especially to a driven disk and clutch facing which may be used in either a multiple disk or single plate clutch.

In my prior invention shown in Patent No. 1,571,747, I have disclosed a disk, the outer section of which is shaped like a truncated cone. This invention constitutes an improvement over my prior clutch disk in that its outer section is shaped like a plurality of truncated cones. In other words, this clutch disk has ben distorted more per unit of sectional area than my previous disclosed clutch disk. Since the distortion per unit of sectional area is greater, it obviously will take a greater bending stress to flatten this disk provided it is of the same thickness as that of my previously disclosed disk. But since the bending stress is the same in both instances when the clutch is let in, this greater distortion per unit of sectional area permits the use of a thinner clutch disk.

It is also the object of this invention to present a novel facing for this improved clutch disk which is adapted to conform nicely to the configuration of the said clutch disk.

Referring to the drawings:

Fig. 1 is an elevation of the disk.

Fig. 2 is a cross section of the clutch facing, prior to its attachment to the disk.

Fig. 3 is a section along the line 3—3 of Fig. 1.

Referring more particularly to the drawings, the flywheel, the rear face of which constitutes a driving disk, may generally be designated 1. The packing ring, which also constitutes a driving disk, may be designated 2. The driven disk 3 is disposed between the driving disks 1 and 2. The driven disk, as shown, is preferably a spoked type disk as described in my Patent No. 1,541,883 and which has slots 16 running in from the periphery of the disk and terminating in the enlarged portions 17 to form the spokes 18.

As shown in Fig. 3, the inner section of the driven disk is flat as at 4, but it is understood that this inner section may be of any other suitable configuration. The outer section of the disk which is roughly the section extending from the periphery about one-sixth of the way in on its spokes, is shaped like a truncated cone. This outer section may be referenced 5. The section immediately within that of the outer section 5 and extending roughly from about one-sixth of the way in on the spokes to the inner section is also shaped like a truncated cone. This section may be referenced 6. These truncated conical sections are so disposed that their apexes are on opposite sides of the disk. It is understood that these sections are not limited to any specific width or shape and that they may extend any suitable distance along the spokes.

By referring to Fig. 3, it will be noted that in cross section, the two outer sections 5 and 6 of the disk are roughly V-shaped. The vertex 7 of the V being offset from the plane of the ends 8 and 9. It is understood that the vertex 7 may be offset any suitable distance from the ends 8 and 9. In other words, the deflection of the outer and inner sections 5 and 6 from the plane of the inner plate portion 4 may be of any suitable degree.

Attached to the conical sections of the disk is the facing 10 which, in this instance, is attached to the disk by means of the rivets 11. The facing 10 is preferably continuous and scarfed concentrically as at 12. The scarf 12 permits the facing to conform nicely to the configuration of the sections 5 and 6 of the disk. After the disk has been used a while, the facing will break along the scarfed area. Hence, this scarfing of the facing obviates the necessity in assembly of having two distinct facings for each face of the disk. This scarfed facing is claimed in my co-pending application, Serial No. 366,347, filed January 31, 1929.

Referring to Fig. 3 it will be noted that as the disks 1 and 2 are brought closer together the driven disk 3 will flex or bend and consequently be flattened gradually and the engaging areas of the disk 3 with the driving disks will gradually increase. This gradual increasing of the said engaging areas will permit the clutch to be gradually engaged without jerking. As the driving disks 1 and 2 are brought farther apart, the engaging areas will gradually decrease and this gradual decreasing of the said engaging areas will permit the clutch to be gradually disengaged.

This gradual flattening of the driven disk is due to its relatively great distortion per unit of sectional area which obviously requires a relatively great bending per unit of sectional area. Owing to this relatively great bending per unit of sectional area, a relatively great stress per unit of sectional area is required to flatten the disk and this permits a relatively thin disk to be used.

It is evident from the above description that I have presented a clutch disk and facing of such a nature that the clutch may be gradually eased into engagement or disengagement without jerking.

What I claim is:

1. A clutch disk for use in the plate type of clutch comprising a distortable metal disk having an outer distorted section substantially V-shaped in cross-section taken radially thereof arranged to be flattened when the disk is engaged and designed to give a relatively large resistance to flattening.

2. A clutch disk comprising a web divided into a plurality of segments each comprising a spoke which can flex by bending along its length and provided at its end with an enlarged portion in the form of segments of a plurality of truncated cones.

3. A clutch disk for plate clutches comprising a slitted disk with a flat center and an outer zone shaped like a plurality of truncated cones.

4. A clutch disk for use in a plate type of clutch comprising a metal disk having a distorted outer section comprising at least two truncated conical portions with their apexes on opposite sides of the disk arranged to require relatively great bending of each area of the distorted portion as the clutch is engaged.

5. A clutch disk comprising a web divided into a plurality of segments each comprising a spoke which can flex by bending along its length, and provided at its end with an enlarged portion substantially V-shaped in cross section which is arranged to be flattened as the clutch is engaged.

In testimony whereof I have affixed my signature.

ERNEST E. WEMP.